(12) United States Patent
Holmes et al.

(10) Patent No.: US 10,982,745 B2
(45) Date of Patent: Apr. 20, 2021

(54) PLANETARY DIFFERENTIAL DRIVE SYSTEM

(71) Applicant: GM Global Technology Operations LLC, Detroit, MI (US)

(72) Inventors: Alan G. Holmes, Clarkston, MI (US); Joseph R. Littlefield, Sterling Heights, MI (US); Brendan M. Conlon, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 65 days.

(21) Appl. No.: 16/248,208

(22) Filed: Jan. 15, 2019

(65) Prior Publication Data
US 2020/0224754 A1 Jul. 16, 2020

(51) Int. Cl.
*F16H 48/42* (2012.01)
*F16H 48/10* (2012.01)
(Continued)

(52) U.S. Cl.
CPC .............. *F16H 48/42* (2013.01); *F16H 1/46* (2013.01); *F16H 48/10* (2013.01); *B60K 17/046* (2013.01); *B60K 17/165* (2013.01); *B60K 17/346* (2013.01); *B60K 17/354* (2013.01); *B60K 2001/001* (2013.01); *F16H 48/11* (2013.01); *F16H 2048/04* (2013.01); *F16H 2048/106* (2013.01); *F16H 2200/201* (2013.01); *F16H 2200/2038* (2013.01)

(58) Field of Classification Search
CPC ........ F16H 2200/201; F16H 2200/2035–2043; F16H 48/10–11; B60K 1/00; B60K 2001/001
See application file for complete search history.

(56) References Cited

U.S. PATENT DOCUMENTS

| 4,357,840 A * | 11/1982 | Winzeler | B62D 11/08 475/205 |
| 5,845,732 A * | 12/1998 | Taniguchi | B60K 1/00 180/65.6 |

(Continued)

FOREIGN PATENT DOCUMENTS

WO WO-2005120877 A1 * 12/2005 ............. F16H 48/10

*Primary Examiner* — Ernesto A Suarez
*Assistant Examiner* — James J Taylor, II
(74) *Attorney, Agent, or Firm* — Quinn IP Law

(57) ABSTRACT

A differential drive system includes an electric motor for generating an electric motor torque and an input planetary gear-set operatively connected to the electric motor to receive the electric motor torque. The input planetary gear-set has first, second, and third members. The first member receives the electric motor torque, the second member provides a first input torque in a first rotational direction in response to the electric motor torque, and the third member provides a second input torque in a second rotational direction, opposite the first direction, in response to the electric motor torque. The system also includes a first output gear-set operatively connected to the input planetary gear-set, and providing a first output torque in response to the first input torque. The system additionally includes a second output gear-set operatively connected to the input planetary gear-set and providing a second output torque in response to the second input torque.

16 Claims, 5 Drawing Sheets

(51) Int. Cl.
*F16H 1/46* (2006.01)
*B60K 1/00* (2006.01)
*F16H 48/00* (2012.01)
*F16H 48/11* (2012.01)
*B60K 17/354* (2006.01)
*B60K 17/04* (2006.01)
*B60K 17/16* (2006.01)
*B60K 17/346* (2006.01)

(56) References Cited

U.S. PATENT DOCUMENTS

| | | | | |
|---|---|---|---|---|
| 5,919,109 A * | 7/1999 | Fleckenstein | ............ | B60T 1/062 |
| | | | | 475/151 |
| 6,892,837 B2 * | 5/2005 | Simmons | ............... | B62D 11/16 |
| | | | | 180/6.44 |
| 7,309,300 B2 * | 12/2007 | Garnett | .................. | B62D 11/06 |
| | | | | 475/18 |
| 7,442,141 B2 * | 10/2008 | Yamauchi | ............... | B60L 50/52 |
| | | | | 475/6 |
| 7,731,614 B2 * | 6/2010 | Casey | ....................... | B60K 1/00 |
| | | | | 475/18 |
| 8,012,057 B2 * | 9/2011 | Meixner | ................ | B60K 17/16 |
| | | | | 475/6 |

* cited by examiner

PLANETARY DIFFERENTIAL DRIVE SYSTEM

INTRODUCTION

The disclosure relates to a planetary differential drive system for a motor vehicle.

Modern motor vehicles are typically configured as either two-wheel-drive, i.e., using a single drive-axle, or as having multiple drive-axles. Either type of a vehicle may employ a conventional powertrain, where a single engine is used to propel the vehicle, an electric powertrain, where an electric motor is used to propel the vehicle, or a hybrid powertrain, where two or more distinct power sources, such as an internal combustion engine and an electric motor, are used to accomplish the same task.

A multiple drive-axle, such as an all-wheel-drive, hybrid vehicle may use a center differential to apportion torque between the vehicle's drive axles. Additionally, a multiple drive-axle hybrid vehicle may have an axle-split configuration. In such a vehicle, independent power-sources, such as an internal combustion engine and an electric motor, are set up to independently power individual vehicle drive axles that are operatively connected to the respective power-sources, thus generating on-demand multiple drive-axle propulsion. In such an axle-split hybrid vehicle employing an engine and an electric motor, the electric motor may be capable of propelling the vehicle via the respective axle while the engine is shut off.

Each powered axle typically includes a final drive assembly with a differential that allows opposite side, i.e., left and right side, driven wheels to rotate at different speeds when the vehicle negotiates a turn. Specifically, the differential permits the driven wheel that is traveling around the outside of the turning curve to roll farther and faster than the driven wheel traveling around the inside of the turning curve, while approximately equal torque is applied to each of the driven wheels. An increase in the speed of one driven wheel is balanced by a decrease in the speed of the other driven wheel, while the average speed of the two driven wheels equals the input rotational speed of the drive shaft connecting the power-source to the differential.

SUMMARY

A differential drive system includes an electric motor configured to generate an electric motor torque and an input planetary gear-set operatively connected to the electric motor to receive the electric motor torque. The input planetary gear-set has first, second, and third members. The first member is configured to receive the electric motor torque, the second member configured to provide a first input torque in a first rotational direction in response to the electric motor torque, and the third member is configured to provide a second input torque in a second rotational direction, opposite the first rotational direction, in response to the electric motor torque. The differential drive system also includes a first output gear-set operatively connected to the input planetary gear-set, and configured to provide a first output torque in response to the first input torque. The differential drive system additionally includes a second output gear-set operatively connected to the input planetary gear-set and configured to provide a second output torque in response to the second input torque.

The differential drive system may also include a differential housing. The electric motor may include a stator and a rotor. The stator may be fixed to the differential housing, and the rotor may be directly connected to the first member of the input planetary gear-set via a sleeve shaft. In such an embodiment, one of the second and third members of the input gear-set may be directly connected to the second output gear-set via a center shaft extending coaxially through the sleeve shaft.

The input planetary gear-set may be a compound gear-set additionally having a fourth member and first and second sets of pinion gears. In such an embodiment, the first member of the compound gear-set may be a first sun gear in mesh with the first set of pinion gears; the second member of the compound gear-set may be a planetary carrier; the third member of the compound gear-set may be a second sun gear in mesh with the second set of pinion gears; and the fourth member of the compound gear-set may be a ring gear. The first sun gear may be configured to receive the electric motor torque, and the second sun gear may be configured to provide the first input torque to the first output gear-set.

The differential drive system may additionally include an input brake configured to selectively ground one of the members of the input planetary gear-set to the differential housing.

The first member of the input planetary gear-set may be a sun gear, the second member of the input planetary gear-set may be a planetary carrier, and the third member of the input planetary gear-set may be a ring gear.

The second member of the input planetary gear-set may be directly connected to the first member of the second output gear-set.

Each of the first and second output gear-sets may be a planetary gear-set having first, second, and third members. In such an embodiment, the second member of the input planetary gear-set may be directly connected to the first member of the second output gear-set.

The differential drive system may additionally include a first output brake configured to selectively ground one of the members of the first output gear-set to the differential housing. Furthermore, the differential drive system may further include a second output brake configured to selectively ground one of the members of the second output gear-set to the differential housing.

The second member of the input planetary gear-set may be directly connected to the first member of the second output gear-set. In such an embodiment, the second member of the first output gear-set may be a planetary carrier configured to provide the first output torque, and the third member of the second output gear-set may be a ring gear configured to provide the second output torque.

Alternatively, the third member of the input planetary gear-set may be directly connected to the first member of the second output gear-set. In such an embodiment, the third member of the first output gear-set may be a planetary carrier configured to provide the first output torque, and the second member of the second output gear-set may be a planetary carrier configured to provide the second output torque.

The differential drive system may be arranged in a motor vehicle employing a drive axle having first and second drive wheels. In such a construction, the first output torque may be configured to power the first drive wheel and the second output torque is configured to power the second drive wheel. Furthermore, in such an embodiment, the first and second output gear-sets may be arranged on respective hubs of the first and second drive wheels.

The differential drive system may be arranged in a multiple drive-axle motor vehicle employing a first drive axle having a first drive wheel and a second drive axle having a second drive wheel. In such an embodiment, the first output torque may be configured to power the first drive wheel and the second output torque may be configured to power the second drive wheel in a second drive axle.

A motor vehicle employing such a differential drive system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
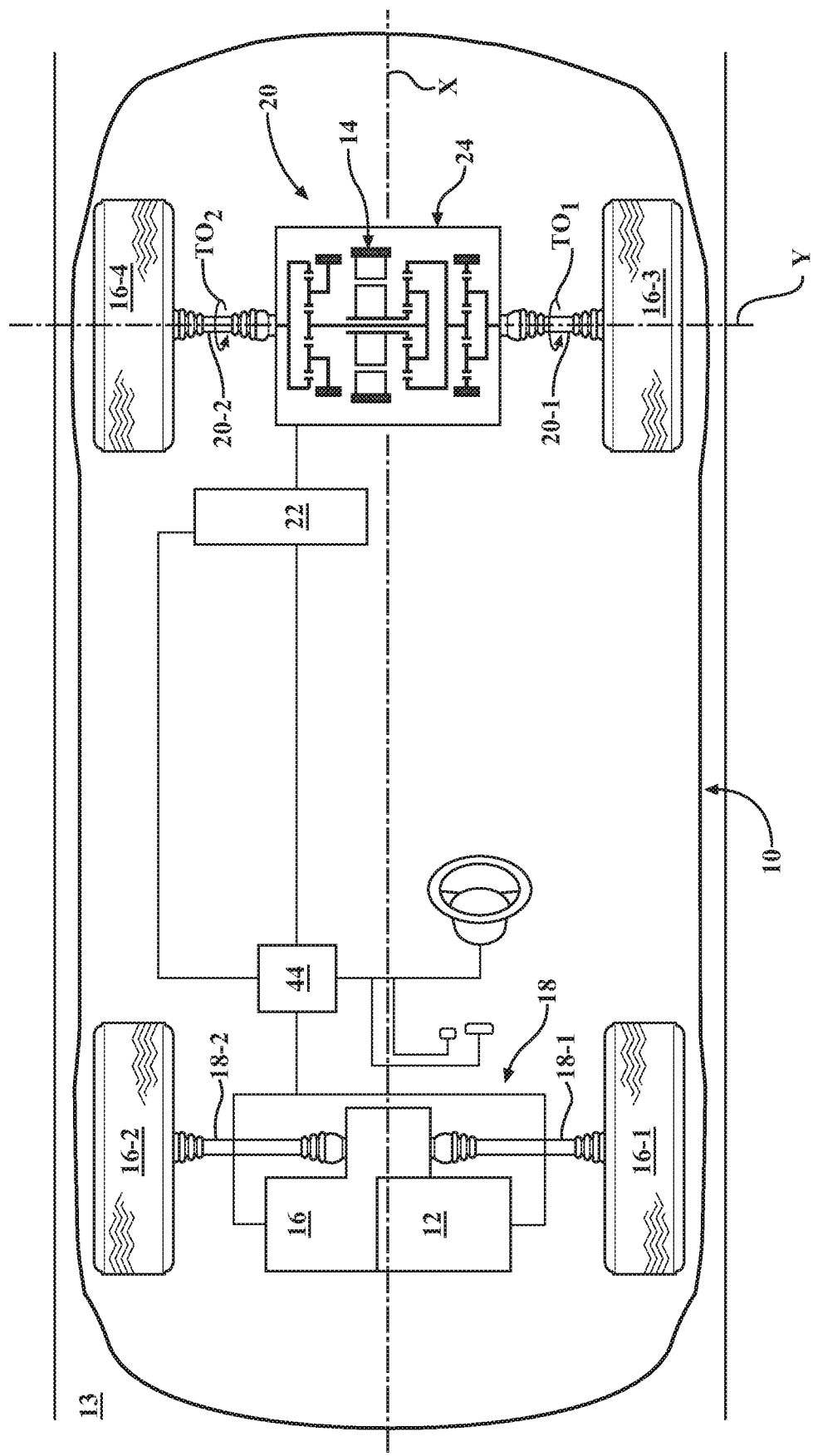
FIG. 1 is a schematic illustration of a motor vehicle having an axle-split multiple drive-axle configuration and employing a differential drive system arranged in an intra-axle configuration, with an electric motor, an input planetary gear-set, and two output planetary gear-sets driving individual axle shafts of a vehicle axle, according to the disclosure.
Figure 2:
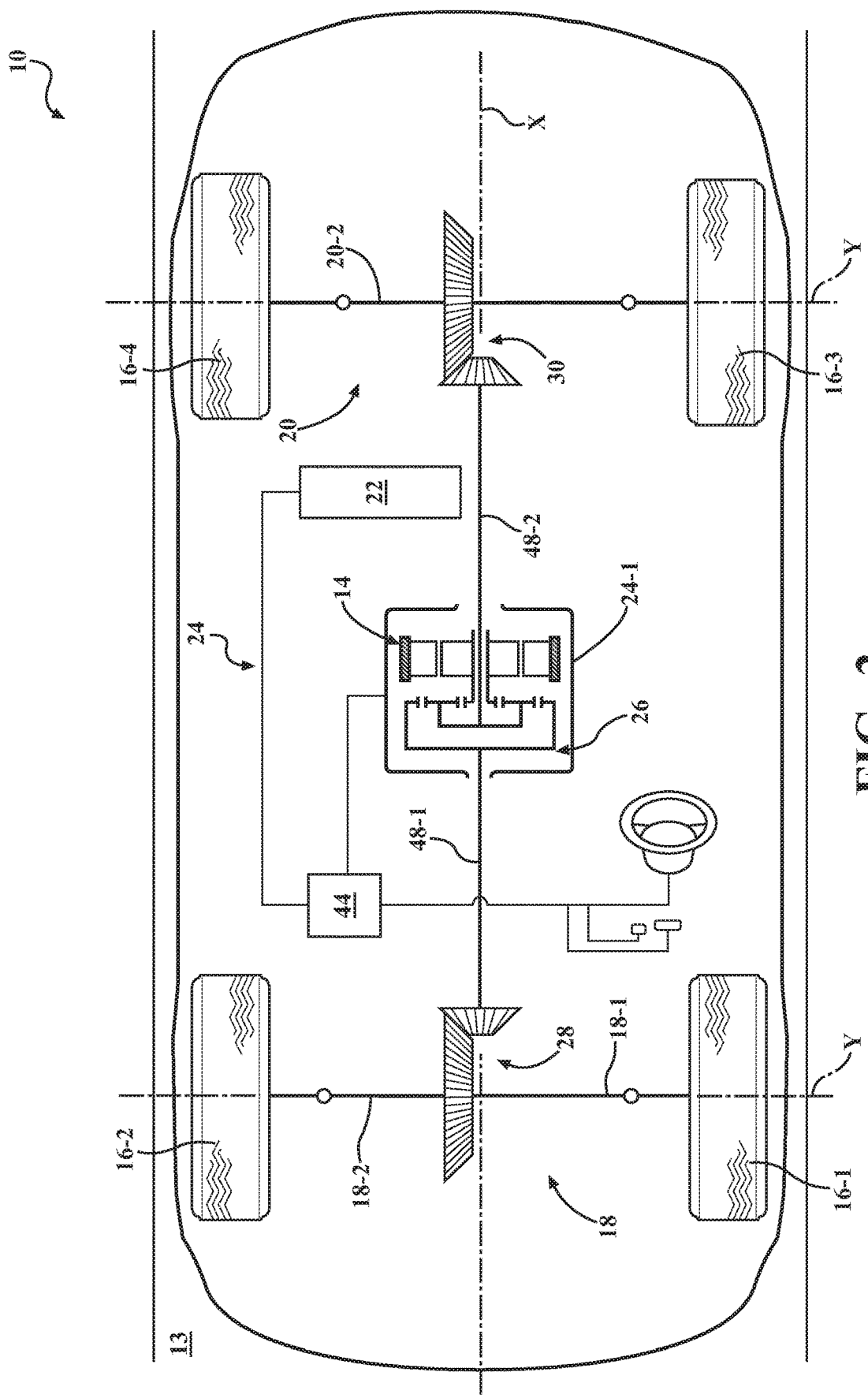
FIG. 2 is a schematic illustration of a motor vehicle having a joined-axle multiple drive-axle configuration and employing the differential drive system arranged in an inter-axle configuration, with an electric motor, an input planetary gear-set, and two output gear-sets driving individual vehicle axles, according to the disclosure.

Referring to the drawings in which like elements are identified with identical numerals throughout, FIGS. 1 and 2 illustrate a wheeled motor vehicle 10. As shown, in FIG. 1, the vehicle 10 is a hybrid vehicle having independent first and second power-sources that are operatively connected to respective sets of driven wheels in order to provide on-demand multiple drive-axle propulsion. As shown in FIG. 2, the vehicle 10 is a battery electric vehicle (BEV). The vehicle 10 may be, but is not limited to, a commercial vehicle, industrial vehicle, passenger vehicle, train or the like. As shown, the vehicle 10 generally includes a combination of power-sources for propulsion.

As shown, the power-sources include an internal combustion engine 12 configured to generate an engine torque, and an electric motor 14, to be discussed in greater detail below, configured to generate an electric motor torque $T_M$. Each of the subject power-sources 12, 14 is configured to drive at least some of the vehicle's respective left- and right-side front road wheels 16-1 and 16-2, and respective left- and right-side rear road wheels 16-3 and 16-4. The specific wheels 16-1, 16-2, 16-3, 16-4 receiving torque from the power-source(s) to power the vehicle 10 down a road surface 13 may be defined as "drive" wheels. As may be seen in FIGS. 1 and 2, the vehicle 10 is generally arranged along a longitudinal vehicle axis X.

As shown, the front road wheels 16-1 and 16-2 are operatively connected by a first or front drive axle 18 having first and second axle-shafts 18-1, 18-2. Similarly, the rear road wheels 16-3 and 16-4 are operatively connected by a second or rear drive axle 20 having first and second axle-shafts 20-1, 20-2. The first drive axle 18 may be operatively independent from the second drive axle 20, such that the engine 12 powers the front axle and the electric motor 14 powers the rear axle. The electric motor 14 receives its electrical energy from an energy storage device 22. As understood by those skilled in the art, the motor 14 includes a stator 14-1 and a rotor 14-2 configured to impart the electric motor torque $T_M$.

According to the present disclosure, the vehicle shown in FIG. 1 has an axle-split multiple drive-axle configuration and may be powered by the electric motor 14, via the electric motor torque $T_M$, independently from the engine 12, and thus provide the vehicle 10 with an on-demand electric axle 18 drive. Generally, the vehicle 10 shown in FIG. 1 may also be powered solely via the electric motor 14, i.e., in a purely electric vehicle or "EV" mode. Alternatively, the vehicle shown in FIG. 2 has a joined-axle AWD configuration, such that each of the first and second axles 16, 18 may be powered by the electric motor 14, via the electric motor torque $T_M$, and thus provide the vehicle 10 with drive through both first and second axles 18, 20.

The vehicle 10 also includes a differential drive system 24 having a differential housing 24-1. As shown, the differential drive system 24 is configured to power first and second road wheels, which may be the left- and right-side front road wheels 16-1 and 16-2, or the left- and right-side rear road wheels 16-3 and 16-4 (shown ion FIG. 1). Alternatively, in the AWD vehicle 10 configuration, the first and second road wheels powered by the differential drive system 24 may be at least one of the left- and right-side front road wheels 16-1 and 16-2, and at least one of the left- and right-side rear road wheels 16-3 and 16-4 (shown in FIG. 2).

The differential drive system 24 includes the electric motor 14. The stator 14-1 of the electric motor 14 is fixed to the differential housing 24-1. As shown in FIG. 2, in the vehicle 10, the electric motor 14 may be arranged on or along the first axis X, such that the rotor 14-2 rotates about the first axis X. Alternatively, as shown in FIG. 1, the electric motor 14 may be arranged on a second axis Y, which is substantially transverse to the first axis X, such that the rotor 14-2 rotates about the second axis Y. The system 24 also includes an input planetary gear-set 26 operatively connected to the electric motor 14 to receive the electric motor torque $T_M$ and having a first member 26-1, second member 26-2, and third member 26-3. The first member 26-1 is configured to receive the electric motor torque $T_M$. The second member 26-2 is configured to provide a first input torque $TI_1$ in a first rotational direction, such as clockwise (CW), in response to the electric motor torque $T_M$. The third member 26-3 is configured to provide a second input torque $TI_2$ in a second rotational direction, opposite the first rotational direction, such as counterclockwise (CCW) in response to the electric motor torque $T_M$. Generally, the input planetary gear-set 26 is configured to split the electric motor power into first and second output portions by using the electric motor torque $T_M$ to produce first and second input torques $TI_1$ and $TI_2$.

The differential drive system 24 also includes a first output gear-set 28, which may be a planetary gear-set having a first member 28-1, a second member 28-2, and third member 28-3, as shown in FIGS. 1 and 3-6. The system 24 further includes a second output gear-set 30, which may be a planetary gear-set having first member 30-1, a second member 30-2, and a third member 30-3, as also shown in FIGS. 1 and 3-6. Alternatively, as shown in FIG. 2, which will be described below, each of the first and second output gear-sets 28, 30 may be configured as a bevel gear-set. In each embodiment, the first output gear-set 28 and the second output gear-set 30 are operatively connected to the first planetary gear-set 26. The first output planetary gear-set 28 is configured to provide a first output torque $TO_1$ in response to the first input torque $TI_1$, while the second output gear-set 30 is configured to provide a second output torque $TO_2$ in response to the second input torque $TI_2$. As will be described in detail below, the first output gear-set 28 and the second output gear-set 30 are used in speed reducing configurations or embodiments that equalize output of two gear-set members of the input planetary gear-set 26.

Figure 3:
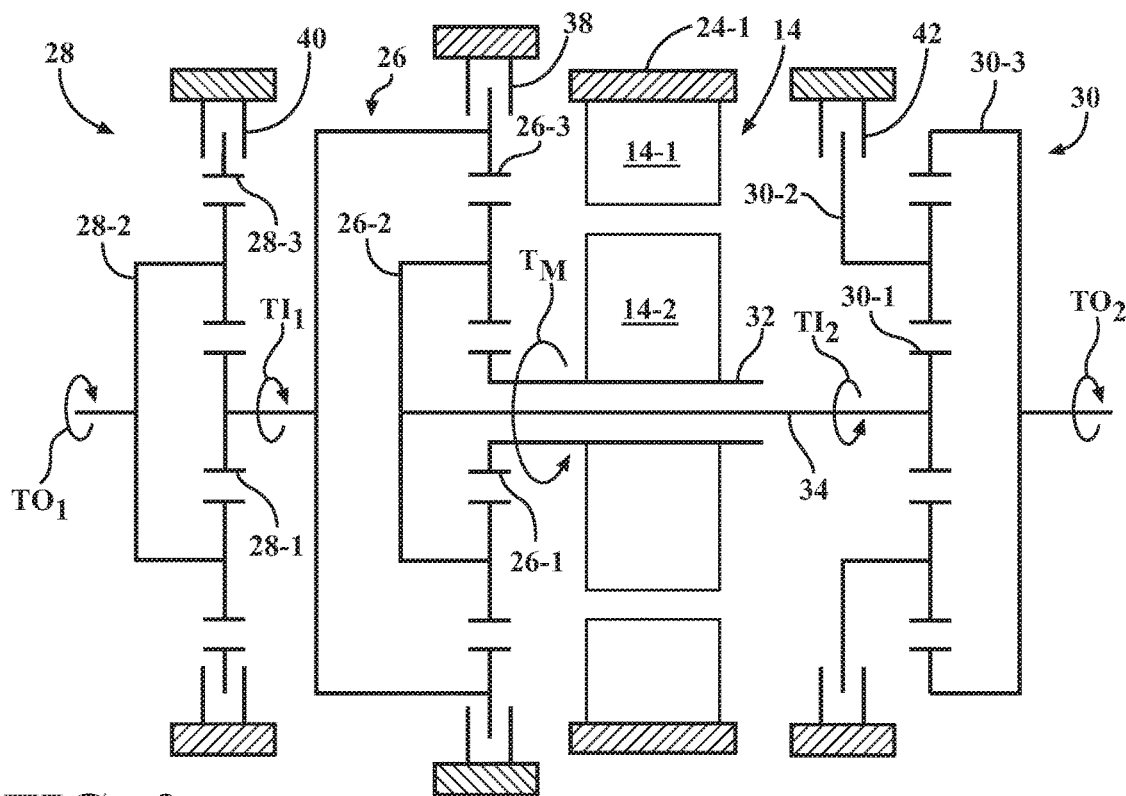
FIG. 3 is a schematic close-up cross-sectional plan view of one embodiment of the differential drive system shown in either FIG. 1 or FIG. 2.
Figure 4:
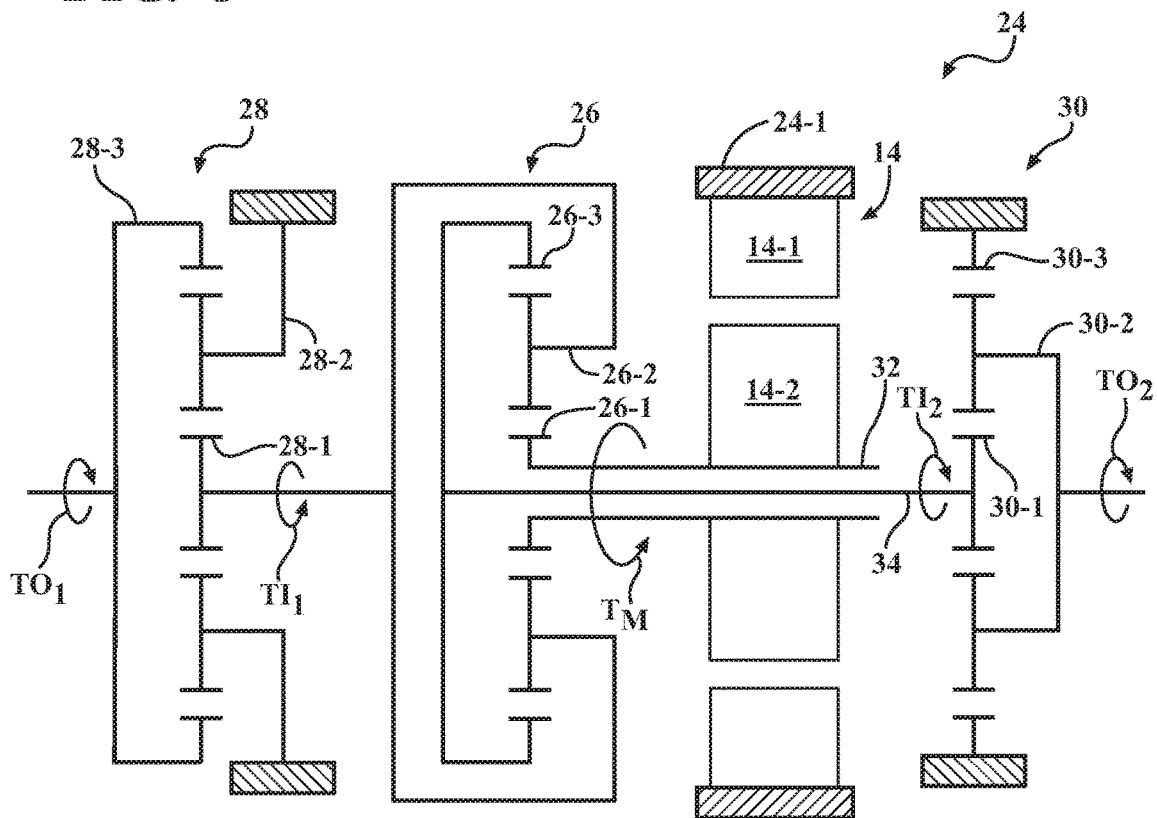
FIG. 4 is a schematic close-up cross-sectional plan view of another embodiment of the differential drive system shown in either FIG. 1 or FIG. 2.

As shown in FIGS. 3 and 4, the rotor 14-2 of the electric motor 14 may be directly connected to the first member 26-1 of the input planetary gear-set 26 via a sleeve or outer concentric shaft 32. One of the second and third members 26-2, 26-3 of the input gear-set 26 may be directly connected to the first member 30-1 of the second output planetary gear-set 30 via a center shaft 34 extending coaxially through the sleeve shaft 32. As shown in FIGS. 3 and 4, the first member 26-1 of the input planetary gear-set 26 may be a sun gear, the second member 26-2 may be a planetary carrier, and the third member 26-3 may be a ring gear. Additionally, as shown in FIG. 3, the third member 26-3 of the input planetary gear-set 26 may be directly connected to the first member 28-1 of the first output planetary gear-set 28. Furthermore, as specifically shown in FIG. 3, the second member 26-2 of the input planetary gear-set 26 may be directly connected to the first member 30-1 of the second output planetary gear-set 30. In the subject embodiment, as shown in FIG. 3, the second member 28-2 of the first output planetary gear-set 28 may be a planetary carrier configured to provide the first output torque $TO_1$. As shown in FIG. 3, in the subject embodiment the third member 30-3 of the second output planetary gear-set 30 may be a ring gear configured to provide the second output torque $TO_2$.

As specifically shown in FIG. 4, the third member 26-3 of the input planetary gear-set 26 may be directly connected to the first member 30-1 of the second output planetary gear-set 30. As also shown in FIG. 4, the second member 26-2 of the input planetary gear-set 26 may be directly connected to the first member 28-1 of the first output planetary gear-set 28. In the subject embodiment, as shown in FIG. 4, the third member 28-3 of the first output planetary gear-set 28 may be a ring gear configured to provide the first output torque $TO_1$. Additionally, as shown in FIG. 4, in the subject embodiment the second member 30-2 of the second output planetary gear-set 30 may be a planetary carrier configured to provide the second output torque $TO_2$. Accordingly, in each of the embodiments depicted in FIGS. 3 and 4, the first output planetary gear-set 28 and the second output planetary gear-set 30 are used in speed reducing configurations that equalize the ring gear and planetary carrier outputs of the power-splitting input planetary gear-set 26.

Figure 5:
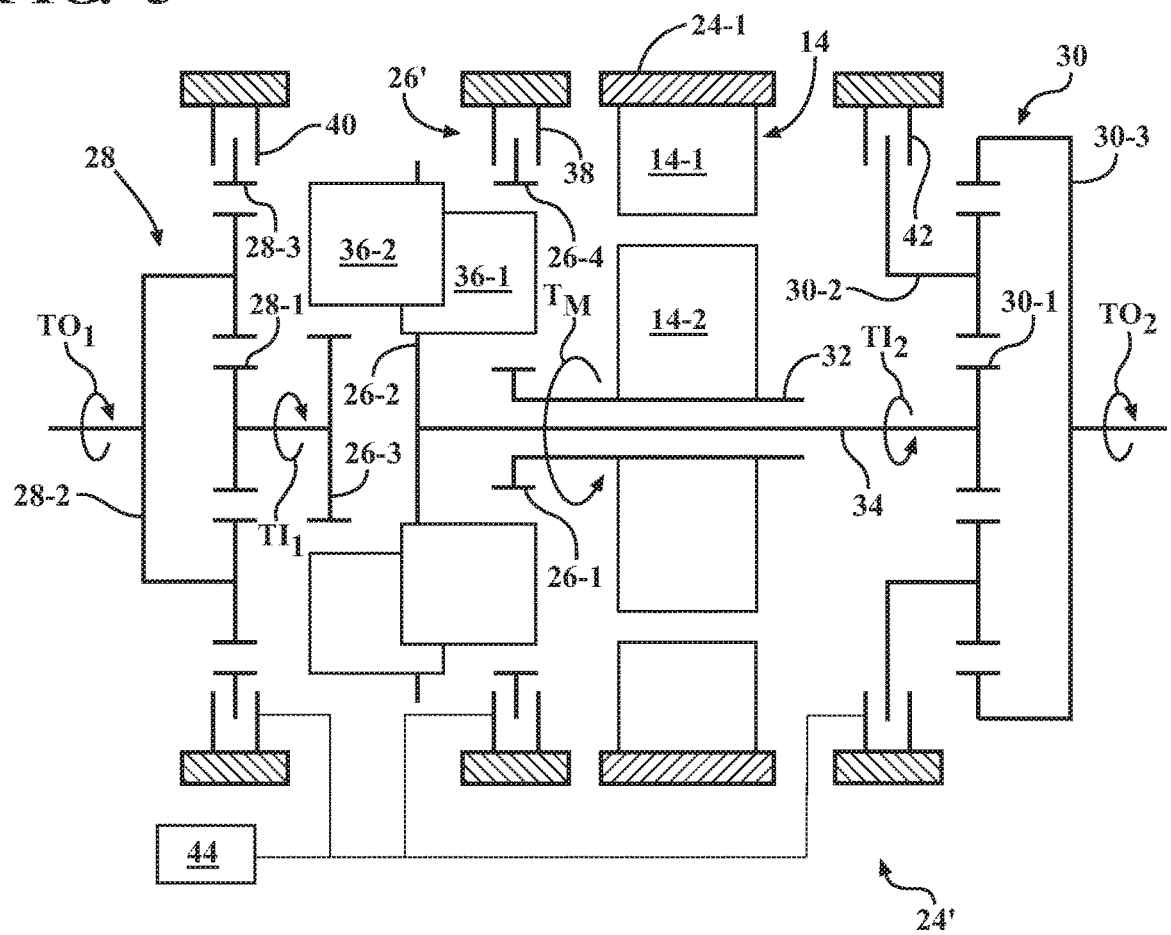
FIG. 5 is a schematic close-up cross-sectional plan view of another embodiment of the differential drive system shown in either FIG. 1 or FIG. 2.

FIG. 5 depicts a differential drive system 24', which is analogous to the differential drive system 24 shown in FIGS. 3 and 4, but for an alternative embodiment of the input planetary gear-set. As shown in FIG. 5, the input planetary gear-set may be configured as a Ravigneaux gear-set 26'. In general, the Ravigneaux planetary gear-set is constructed from two meshed gear pairs—a ring gear member/planetary gear pair and a planetary gear/sun gear pair. A Ravigneaux planetary gear-set may have two sun gears members—a large sun gear and a small sun gear. Alternatively, a Ravigneaux planetary gear-set may have two separate ring gears. A Ravigneaux planetary gear-set has a single planet carrier member holding two sets of planetary or pinion gears—inner planetary gears and outer planetary gears. The planet carrier member is a single sub-assembly that supports the inner and outer planetary gears on distinct, respective inner and outer pitch circles.

In a typical Ravigneaux planetary gear-set, the two sets of planetary gears are in mesh and therefore co-rotate with a fixed gear ratio with respect to each other, but independently of the carrier. In the embodiment employing two sun gear members, the inner planetary gears couple with the small sun gear and co-rotate at a fixed gear ratio with respect thereto, while the outer planetary gears couple with the large sun gear and co-rotate with a fixed gear ratio with respect thereto. In the embodiment employing two ring gear members, one ring gear member may mesh with the outer planetary gears and co-rotate with the subject outer planetary gears in a fixed gear ratio, while another ring gear member may mesh with the inner planetary gears and co-rotate with the subject inner planetary gears in a fixed gear ratio.

FIG. 5 depicts a separate embodiment of the differential drive system, identified via numeral 24'. In the system 24', the input planetary gear-set is a compound gear set, shown as a Ravigneaux planetary gear-set 26'. As compared with the "conventional" input planetary gear-set 24 described with respect to FIGS. 3 and 4, the input Ravigneaux planetary gear-set 26' additionally includes a fourth member 26-4, as well as respective first and second sets of pinion gears 36-1, 36-2. The first member 26-1 of the Ravigneaux gear-set 26' may be a first sun gear in mesh with the first set of pinion gears 36-1. The second member 26-2 of the Ravigneaux gear-set 26' may be a planetary carrier. The third member 26-3 of the Ravigneaux gear-set 26' may be a second sun gear in mesh with the second set of pinion gears 36-2. The fourth member 26-4 of the Ravigneaux gear-set 26' may be a ring gear. As shown, in the embodiment of FIG. 5, the first sun gear 26-1 may be configured to receive the electric motor torque $T_M$, and the second sun gear 26-3 is configured to provide the first input torque $TI_1$ in the first rotational direction in response to the electric motor torque $T_M$ to the first output planetary gear-set 28. Accordingly, in the embodiment depicted in FIG. 5, the first output planetary gear-set 28 and the second output planetary gear-set 30 are used in speed reducing configurations that equalize the sun gear and planetary carrier outputs of the power-splitting input Ravigneaux planetary gear-set 26'.

With continued reference to FIG. 5, the differential drive system 24' may also include at least one controllable brake configured to selectively ground, such as with a controlled amount of slip, a respective at least one member of the input planetary gear-set 26', the first output planetary gear-set 28, and the second planetary gear-set 30 to the differential housing 24-1. Specifically, the subject brake may be a slip brake configured to apply a torque to the respective at least one member of the input planetary gear-set 26', the first output planetary gear-set 28, and the second planetary gear-set 30 to thereby regulate an amount of the first output torque $TO_1$ and the second output torque $TO_2$. As shown, the differential system 24' may include an input brake 38 configured to apply a torque to the fourth member 26-4 of the input planetary gear-set 26', a first output brake 40 configured to apply a torque to the third member 28-3 of the first output planetary gear-set 28, and a second output brake 42 configured to apply a torque to the second member 30-2 of the second planetary gear-set 30.

Figure 6:
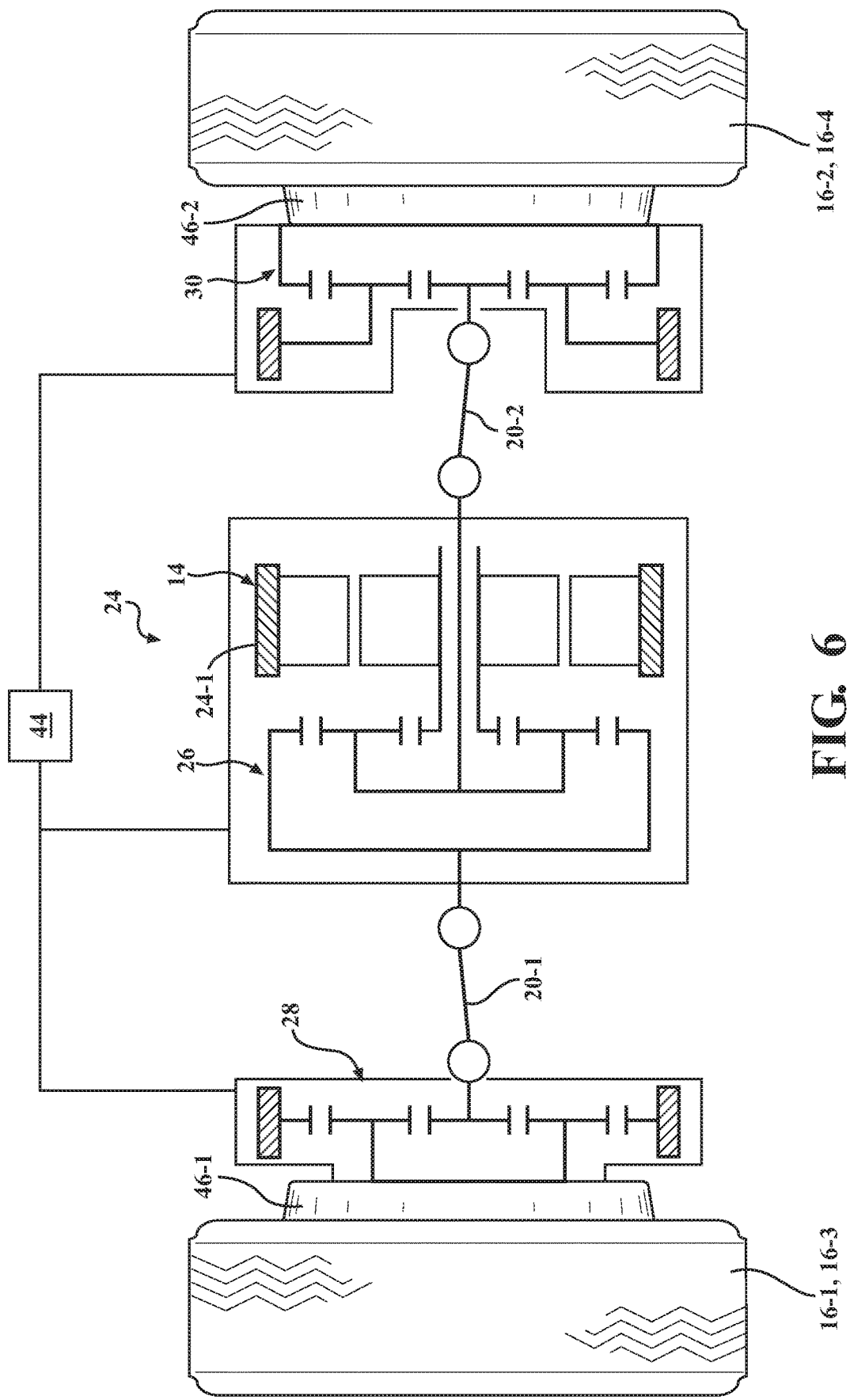
FIG. 6 is a schematic close-up cross-sectional plan view of the differential drive system shown in either FIG. 3, 4, or 5, having wheel hub mounted first and second output planetary gear-sets.

Each of the embodiments of the differential drive system 24 depicted in FIGS. 3, 4 and 6 may include the above-described input brake 38 (as shown in FIG. 3). Control of the input brake 38 is configured to alternately, i.e., selectively, ground or permit controlled slip thereof relative to the differential housing 24-1. The input brake 38 may be configured to apply a torque, while experiencing slippage, to the third member 26-3 of the input planetary gear-set 26 to increase the second output torque $TO_2$ relative to the first output torque $TO_1$. Likewise, a complementary selectable input brake (not shown) may be included in the differential drive system 24 and configured to apply a torque, while experiencing slippage, to the second member 26-2 of the input planetary gear set 26 to increase the first output torque $TO_1$ relative to the second output torque $TO_2$. Accordingly, such usage of an input brake 38 is configured to generate torque vectoring for the vehicle 10.

Additionally, each of the embodiments of the differential drive system 24 depicted in FIGS. 3, 4, and 6 may include the first and second output brakes 40, 42 (as shown in FIG. 3). The selectable first output brake 40 may be configured to apply a torque to the third member 28-3 of the first output planetary gear-set 28, and the selectable second output brake 42 may be configured to apply a torque to the second member 30-2 of the second planetary gear-set 30, to thereby alternatively ground or permit rotation thereof relative to the differential housing 24-1. Accordingly, release of one or both of the output brakes 40, 42, may permit the road wheels 16-3, 16-4 of a second drive axle 20 in the vehicle 10 to rotate while the electric motor 14 does not rotate, and while the vehicle 10 is being driven by another power-source 12. Fully locking the output brakes 40, 42 only below a predetermined speed of the vehicle 10 may permit the differential drive system 24 to be configured with a large overall ratio, e.g., 40:1, between the electric motor torque $T_M$ and the sum of first and second output torques $TO_1$, $TO_2$, while limiting the maximum rotational speed of the electric motor 14 for selectively driving a vehicle 10 with multiple power-sources 12, 14.

As shown in FIGS. 1 and 5, the vehicle 10 may also include a programmable controller 44 configured to regulate and coordinate operation of the first power-source, such as the internal combustion engine 12, and the electric motor 14. Additionally, the controller 44 may be programmed to control the operation of the differential drive system 24' in response to command(s) from an operator of the subject vehicle as the vehicle traverses the road surface 13. Specifically, the controller 44 may be programmed to modulate the amount of force, applied to the respective slip brakes 38-42, for example, via a hydraulic pressure, to appropriately transmit electric motor torque $T_M$ to any of the selected road wheels 16-1, 16-2, 16-3, and 16-4. To accomplish the above, the controller 44 may include a processor and tangible, non-transitory memory, which includes instructions for operation of the differential drive system 24, 24' programmed therein. The memory may be a recordable medium that participates in providing computer-readable data or process instructions. Such a recordable medium may take many forms, including but not limited to non-volatile media and volatile media.

Non-volatile media for the controller 44 may include, for example, optical or magnetic disks and other persistent memory. Volatile media may include, for example, dynamic random access memory (DRAM), which may constitute a main memory. Appropriate instructions may be transmitted by one or more transmission medium, including coaxial cables, copper wire and fiber optics, including the wires that comprise a system bus coupled to a processor of a computer. Memory of the controller 44 may also include a flexible disk, hard disk, magnetic tape, another magnetic medium, a CD-ROM, DVD, another optical medium, etc. The controller 44 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 44 or accessible thereby may be stored in the memory and automatically executed to provide the required functionality of the vehicle 10 and the differential drive system 24'.

With resumed reference to FIG. 1 showing an axle-split multiple drive-axle configuration, the differential drive system 24 (or 24') may be arranged on the specific second drive axle 20 (or on the first axle 18, if the electric motor 14 is arranged on the first axle), and configured to operate as an intra-axle differential. For example, if the differential drive system 24 or 24' is arranged on the second drive axle 20, as part thereof, proximate the axis X, the first output torque $TO_1$ may be transmitted to the first axle-shaft 20-1 and the second output torque $TO_2$ may be transmitted to the second axle-shaft 20-2. Alternatively, the first output planetary gear-set 28 and the second output planetary gear-set 30 may be arranged remotely from the input planetary gear-set 26, either at the respective left- and right-side front 16-1 and 16-2, or at the respective left- and right-side rear road wheels 16-3 and 16-4. For example, the first and second output planetary gear-sets 28, 30 may be mounted by or on the respective wheel hubs 46-1 and 46-2 (shown in FIG. 6) of the respective first and second drive wheels 16-1, 16-3 and 16-2, 16-4.

In the embodiment shown in FIG. 6, wherein the differential drive system 24 (or 24') is arranged on the second drive axle 20, the input planetary gear-set 26 transfers the first input torque $TI_1$ operatively or indirectly to the first output planetary gear-set 28 via the first axle-shaft 20-1, and operatively transfers the second input torque $TI_2$ to the second output planetary gear-set 30 via the second axle-shaft 20-2. Accordingly, in such an example, each of the first output torque $TO_1$ and the second output torque $TO_2$ is configured to power the second drive axle 20. Additionally, the differential housing 24-1 is configured to accommodate and encase the electric motor 14 and the input planetary gear-set 26 or 26', and in the embodiments shown in FIGS. 3-5, the differential housing may additionally accommodate the first and second output planetary gear-sets 28, 30.

In a separate embodiment, as shown in FIG. 2, in the motor vehicle 10 having the above-described joined multiple-axle configuration, the differential drive system 24 (or 24') may be arranged between the specific drive axles 18, 20, and configured to operate as an inter-axle differential to power a first and second road wheel. In such an embodiment, each of the first and second output gear-sets 28, 30 may be configured as a planetary gear-set having the respective first, second and third members 28-1, 28-2, 28-3 and 30-1, 30-2, 30-3, as described above with respect to FIGS. 1 and 3-6, or as a bevel gear-set specifically shown in FIG. 2. Furthermore, the first road wheel powered by the differential drive system 24 (or 24') may be one of the left- and right-side front road wheels 16-1 and 16-2, and the second road wheel may be one of the left- and right-side rear road wheels 16-3 and 16-4. The system shown in FIG. 2 employs a first drive shaft

48-1 and a second drive shaft 48-2 to transfer first and second input torques $TI_1$, $TI_2$ to the respective first and second drive axles 18, 20.

As shown, the input planetary gear-set 26 transfers the first input torque $TI_1$ operatively or indirectly to the first planetary gear-set 28 via the first drive shaft 48-1, and operatively transfers the second input torque $TI_2$ to the second output gear-set 30 via the second drive shaft 48-2. Alternatively, although not specifically shown, the first output gear-set 28 may receive the first input torque $TI_1$ directly from the input planetary gear-set 26 and transfer the first output torque $TO_1$ to the first drive shaft 48-1. Similarly, the second output gear-set 30 may receive the second input torque $TI_2$ directly from the input planetary gear-set 26 and transfer the second output torque $TO_2$ to the second drive shaft 48-2. In either alternative of the inter-axle differential, the first output torque $TO_1$ is configured to power the first drive axle 18 and the second output torque $TO_2$ is configured to power the second drive axle 20.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A differential drive system comprising:
    a differential housing;
    an electric motor configured to generate an electric motor torque;
    an input planetary gear-set operatively connected to the electric motor to receive the electric motor torque and having first, second, and third members, wherein:
        the first member is configured to receive the electric motor torque;
        the second member is configured to provide a first input torque in a first rotational direction in response to the electric motor torque; and
        the third member is configured to provide a second input torque in a second rotational direction, opposite the first rotational direction, in response to the electric motor torque;
    an input brake configured to selectively ground a single one of the members of the input planetary gear-set to the differential housing;
    a first output gear-set operatively connected to the input planetary gear-set, and configured to provide a first output torque in response to the first input torque; and
    a second output gear-set operatively connected to the input planetary gear-set and configured to provide a second output torque in response to the second input torque
    wherein:
        the electric motor includes a stator and a rotor;
        the stator is fixed to the differential housing;
        the rotor is directly connected to the first member of the input planetary gear-set via a sleeve shaft; and
        one of the second and third members of the planetary input gear-set is directly connected to the second output gear-set via a center shaft extending coaxially through the sleeve shaft.

2. The differential drive system according to claim 1, wherein the input planetary gear-set is a compound gear-set additionally having a fourth member and first and second sets of pinion gears, and wherein:
    the first member of the compound gear-set is a first sun gear in mesh with the first set of pinion gears;
    the second member of the compound gear-set is a planetary carrier;
    the third member of the compound gear-set is a second sun gear in mesh with the second set of pinion gears; and
    the fourth member of the compound gear-set is a ring gear.

3. The differential drive system according to claim 1, wherein the first member of the input planetary gear-set is a sun gear, the second member of the input planetary gear-set is a planetary carrier, and the third member of the input planetary gear-set is a ring gear.

4. The differential drive system according to claim 3, wherein each of the first and second output gear-sets is a planetary gear-set having first, second, and third members.

5. The differential drive system according to claim 4, further comprising a first output brake configured to selectively ground one of the members of the first output gear-set to the differential housing, and a second output brake configured to selectively ground one of the members of the second output gear-set to the differential housing.

6. The differential drive system according to claim 4, wherein the second member of the input planetary gear-set is directly connected to the first member of the second output gear-set, and wherein the second member of the first output gear-set is a planetary carrier configured to provide the first output torque, and the third member of the second output gear-set is a ring gear configured to provide the second output torque.

7. The differential drive system according to claim 1, wherein the differential drive system is arranged in a motor vehicle employing a drive axle having first and second drive wheels, and wherein the first output torque is configured to power the first drive wheel and the second output torque is configured to power the second drive wheel.

8. The differential drive system according to claim 1, wherein the differential drive system is arranged in a multiple drive-axle motor vehicle employing a first drive axle having a first drive wheel and a second drive axle having a second drive wheel, and wherein the first output torque is configured to power the first drive wheel and the second output torque is configured to power the second drive wheel.

9. A motor vehicle comprising:
    a first road wheel and a second road wheel;
    a differential drive system configured to power the first and second road wheels, the system including:
        a differential housing;
        an electric motor configured to generate an electric motor torque;
        an input planetary gear-set operatively connected to the electric motor to receive the electric motor torque and having first, second, and third members;
        wherein:
            the first member is configured to receive the electric motor torque;

the second member is configured to provide a first input torque in a first rotational direction in response to the electric motor torque; and the third member is configured to provide a second input torque in a second rotational direction, opposite the first rotational direction, in response to the electric motor torque;

an input brake configured to selectively ground a single one of the members of the input planetary gear-set to the differential housing;

a first output gear-set operatively connected to the input planetary gear-set, and configured to provide a first output torque to the first road wheel in response to the first input torque; and a second output gear-set operatively connected to the input planetary gear-set and configured to provide a second output torque to the second road wheel in response to the second input torque wherein:
the electric motor includes a stator and a rotor;
the stator is fixed to the differential housing;
the rotor is directly connected to the first member of the input planetary gear-set via a sleeve shaft; and
one of the second and third members of the planetary input gear-set is directly connected to the second output gear-set via a center shaft extending coaxially through the sleeve shaft.

10. The motor vehicle according to claim 9, wherein the input planetary gear-set is a compound gear-set additionally having a fourth member and first and second sets of pinion gears, and wherein:

the first member of the compound gear-set is a first sun gear in mesh with the first set of pinion gears;

the second member of the compound gear-set is a planetary carrier;

the third member of the compound gear-set is a second sun gear in mesh with the second set of pinion gears; and the fourth member of the compound gear-set is a ring gear.

11. The motor vehicle according to claim 9, wherein the first member of the input planetary gear-set is a sun gear, the second member of the input planetary gear-set is a planetary carrier, and the third member of the input planetary gear-set is a ring gear.

12. The motor vehicle according to claim 11, wherein each of the first and second output gear-sets is a planetary gear-set having first, second, and third members.

13. The motor vehicle according to claim 12, wherein the differential drive system additionally includes a first output brake configured to selectively ground one of the members of the first output gear-set to the differential housing, and a second output brake configured to selectively ground one of the members of the second output gear-set to the differential housing.

14. The motor vehicle according to claim 12, wherein the second member of the input planetary gear-set is directly connected to the first member of the second output gear-set, and wherein the second member of the first output gear-set is a planetary carrier configured to provide the first output torque, and the third member of the second output gear-set is a ring gear configured to provide the second output torque.

15. The motor vehicle according to claim 9, further comprising a drive axle having the first road wheel and the second road wheel, wherein the differential drive system is arranged on the drive axle, and wherein each of the first output torque and the second output torque is configured to power the drive axle.

16. The motor vehicle according to claim 9, wherein the vehicle has a multiple drive-axle configuration, further comprising a first drive axle connected to the first road wheel and a second drive axle connected to the second road wheel, wherein the first output torque is configured to power the first drive axle and the second output torque is configured to power the second drive axle.

* * * * *